June 22, 1965  E. J. CROSSLAND ETAL  3,190,549
CLASSIFICATION LOCKOUT FOR VOTING MACHINES
Filed July 30, 1962  7 Sheets-Sheet 1
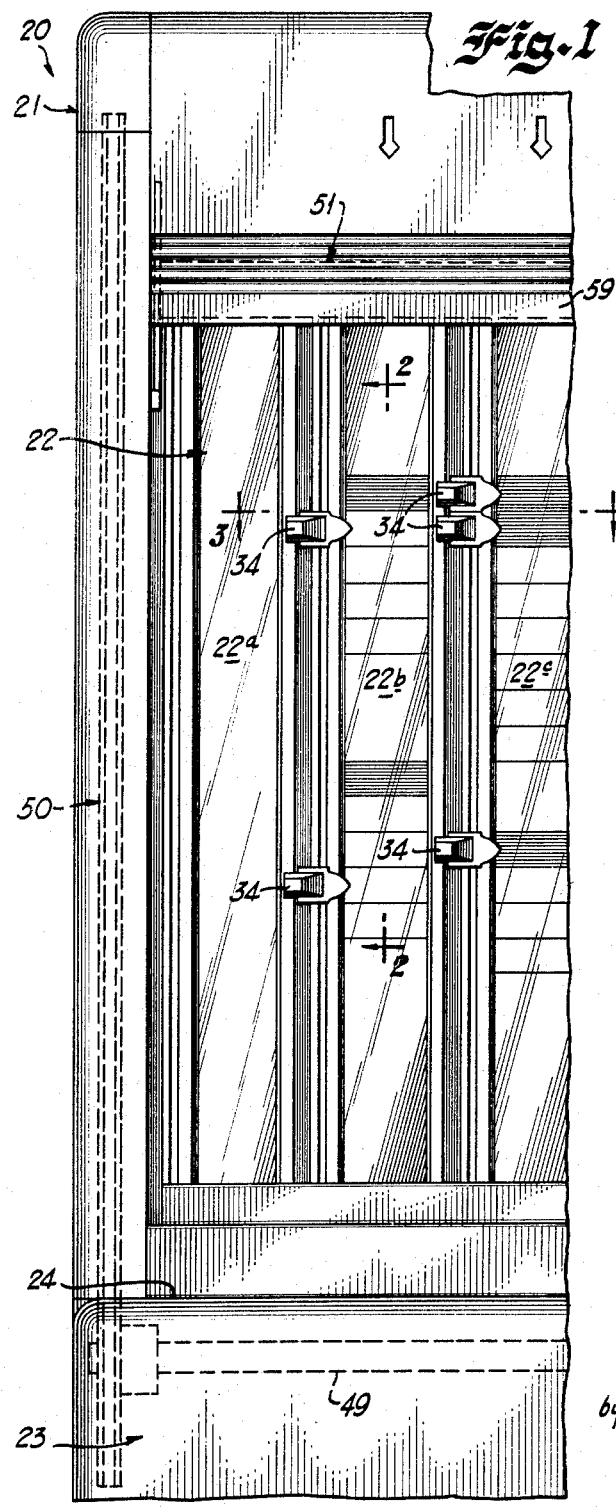
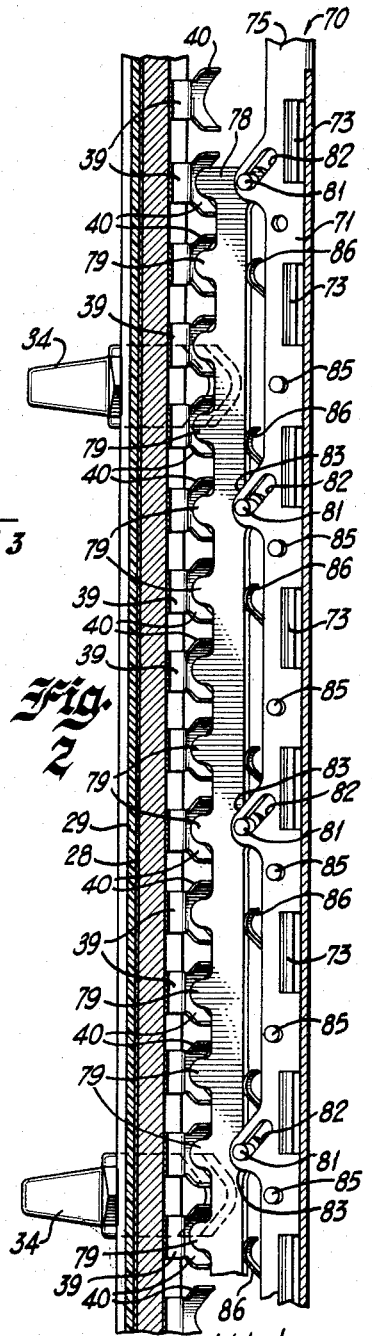
INVENTORS
EDWARD J. CROSSLAND,
HUGH H. BRIGHT AND
CHARLES K. BARTON
by Mason, Kolehmainen,
Rathburn and Wyss
ATTORNEYS.

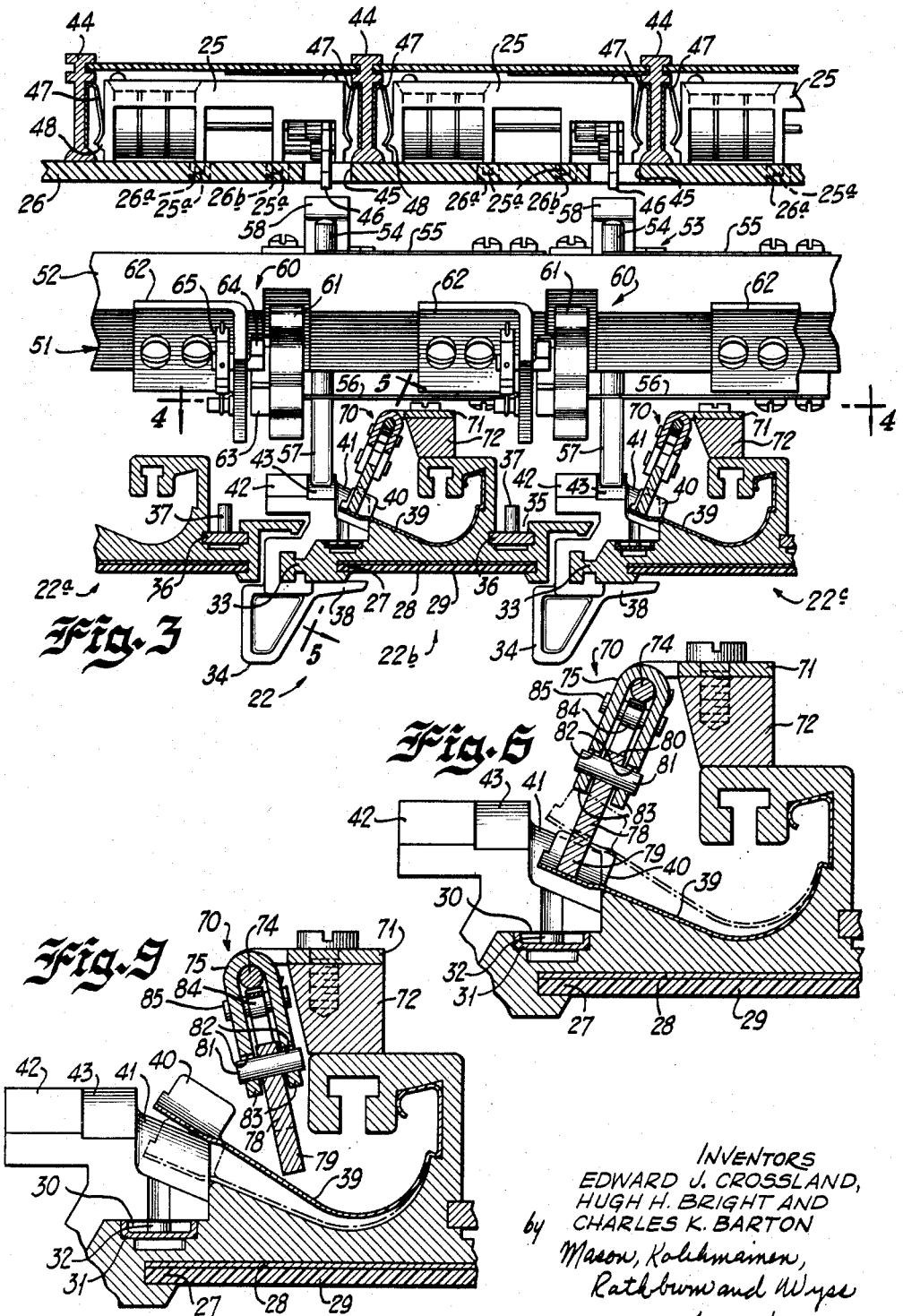

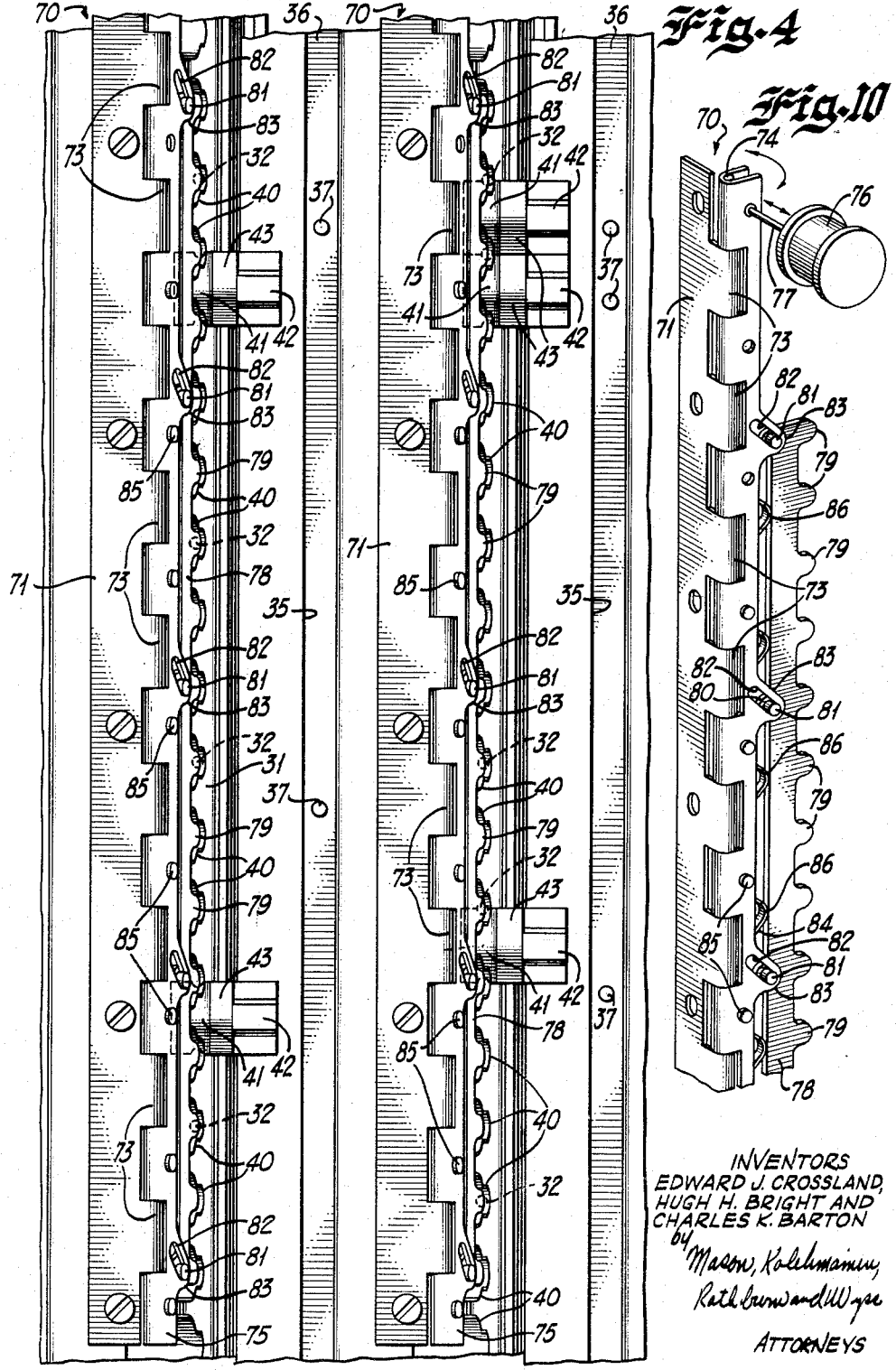

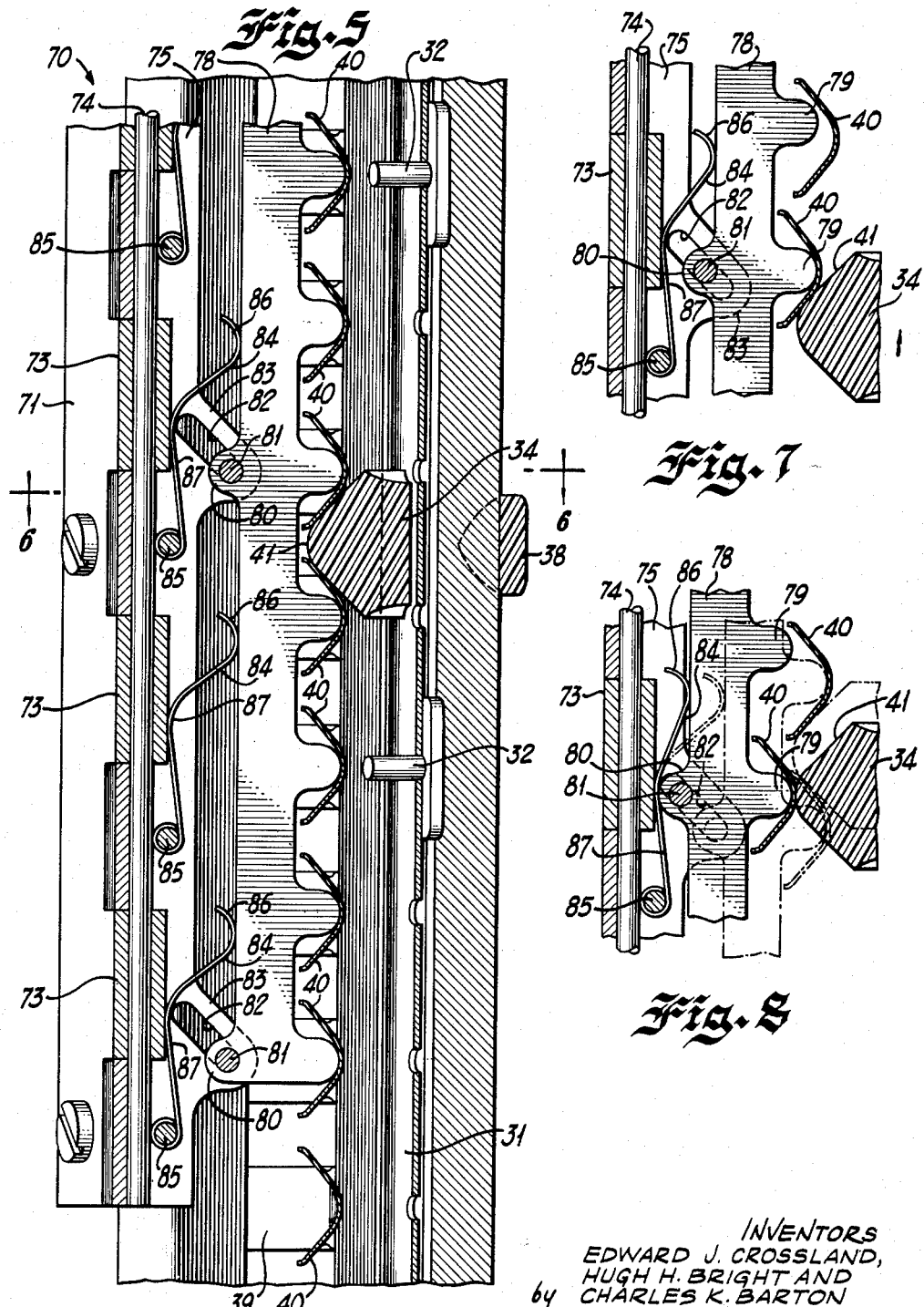

June 22, 1965 E. J. CROSSLAND ETAL 3,190,549
CLASSIFICATION LOCKOUT FOR VOTING MACHINES
Filed July 30, 1962 7 Sheets-Sheet 5
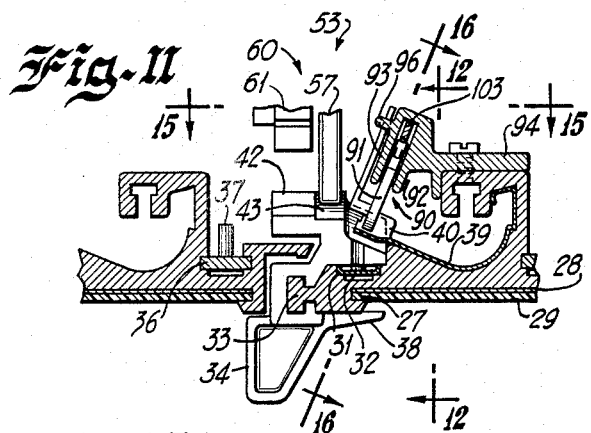
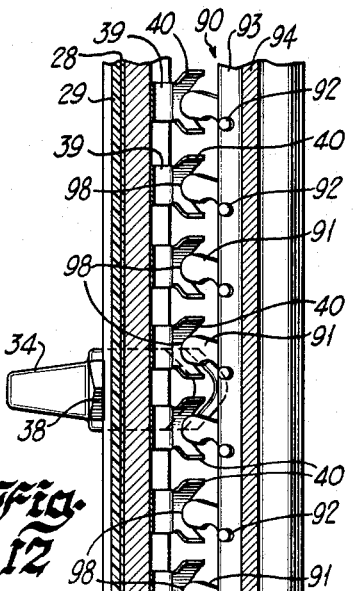
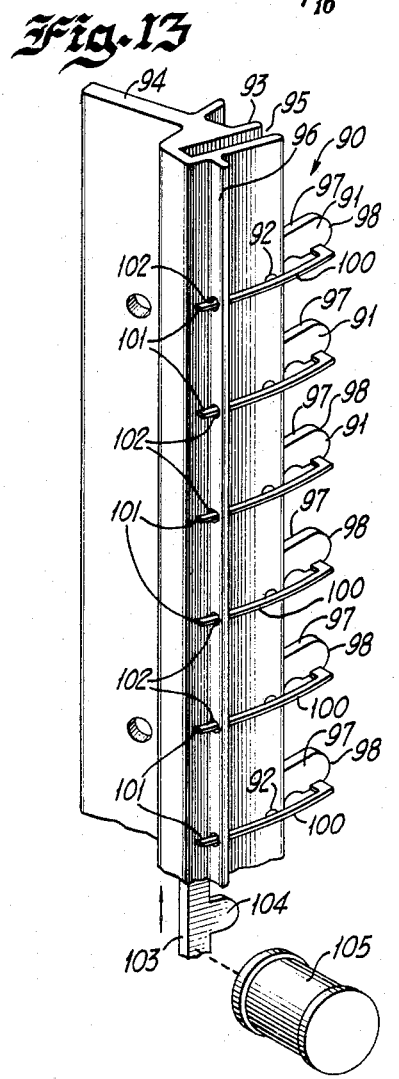
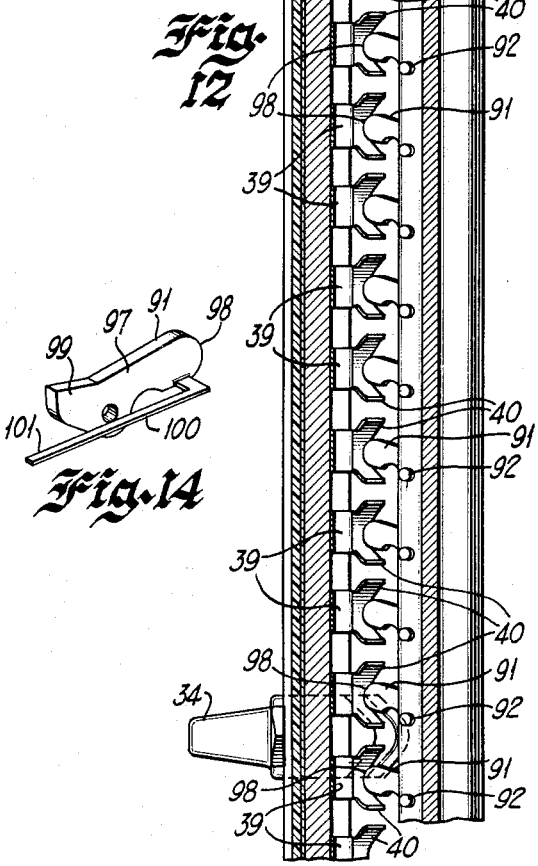
INVENTORS
EDWARD J. CROSSLAND,
HUGH H. BRIGHT AND
BY CHARLES K. BARTON
Mason, Kolehmainen, Rathburn and Wyss
ATTORNEYS June 22, 1965 E. J. CROSSLAND ETAL 3,190,549
CLASSIFICATION LOCKOUT FOR VOTING MACHINES
Filed July 30, 1962 7 Sheets-Sheet 6

INVENTORS
EDWARD J. CROSSLAND,
HUGH H. BRIGHT AND
BY CHARLES K. BARTON

Mason, Kolehmainen, Rathburn and Wyss
ATTORNEYS

June 22, 1965 E. J. CROSSLAND ETAL 3,190,549
CLASSIFICATION LOCKOUT FOR VOTING MACHINES
Filed July 30, 1962 7 Sheets-Sheet 7
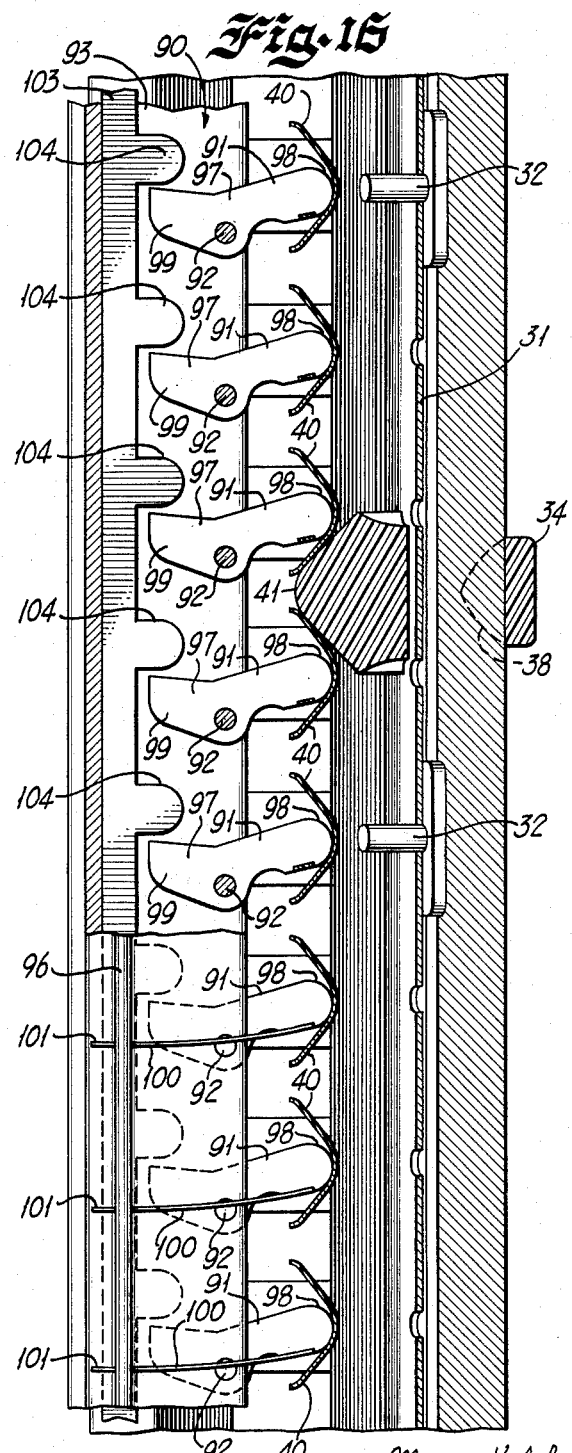
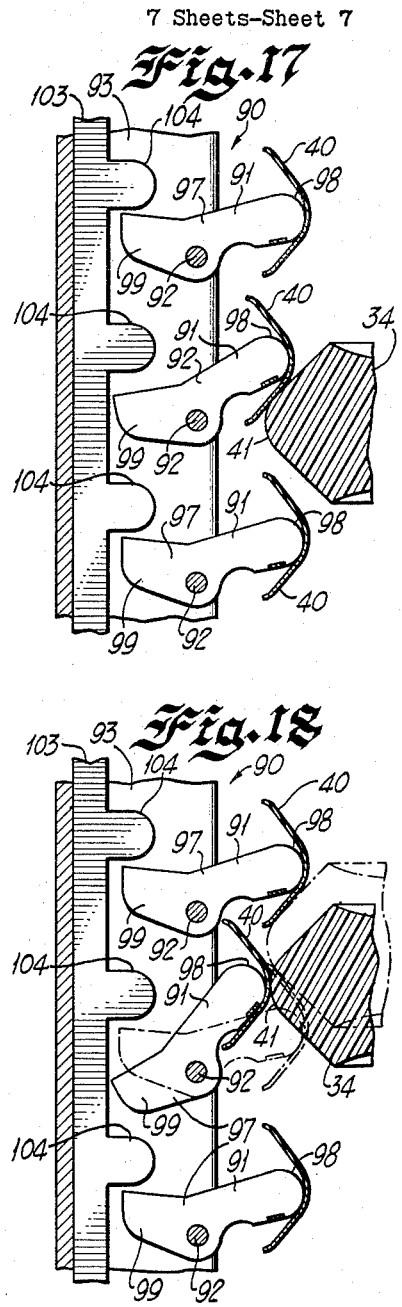
INVENTORS
EDWARD J. CROSSLAND,
HUGH H. BRIGHT AND
BY CHARLES K. BARTON
Mason, Kolehmainen, Rathburn and Wyss
ATTORNEYS.

United States Patent Office 3,190,549
Patented June 22, 1965

3,190,549
CLASSIFICATION LOCKOUT FOR
VOTING MACHINES
Edward J. Crossland, Hugh H. Bright, and Charles K.
Barton, Tulsa, Okla., assignors to Seismograph Service
Corporation, Tulsa, Okla., a corporation of Delaware
Filed July 30, 1962, Ser. No. 213,288
42 Claims. (Cl. 235—54)

This invention relates generally to voting machines of the type employing sliding keys or selectors for use by the voter to make his selections and is more particularly concerned with a new and improved voting machine of this type having new and improved lockout structure for limiting the voter's selections to those issues for which he is qualified. More particularly, the present invention is an improvement upon voting machines of the type disclosed in U.S. application Serial No. 74,887 filed December 9, 1960, by Edward J. Crossland et al. and U.S. application Serial No. 120,281 filed June 28, 1961, by Edward J. Crossland et al., and now Patent No. 3,108,744, both of which are assigned to the same assignee as the present invention.

A voting machine must be suitable for use both in primary elections and in general elections. When it is used in a primary election the arrangement must be such that the voter may cast his votes only for candidates of his own party. This means either that separate machines must be provided at each voting station for the different political parties participating in the election or that the machine must be so programmed or set up by an election official prior to the use of the machine by each voter that the voter cannot participate in the selection of candidates of parties other than his own. A similar problem arises in some elections where a voter may not be qualified to vote on certain issues as, for example, in the case of issues where only real property owners are eligible to participate. The use of separate voting machines in such special cases or in primary elections is, of course, expensive and, particularly in regions where relatively small numbers of voters use a voting station, is not a very practical solution to the problem. The programming of the machine for each voter is a laborious and time consuming operation and, hence, considerably impedes the progress of the election. Moreover, the mechanism employed in prior art machines to accomplish the result has been very complex and expensive, since these machines have resorted to elaborate interlock arrangements connected between the different selectors of the voting machine.

The copending application Serial No. 74,887 referred to above discloses a voting machine having means for automatically setting up the machine according to the voter's classification in response to information sensed from a pre-punched card supplied to the voter. The voter is prevented from casting votes upon issues for which he is not qualified to participate by moving the counter actuator for such issues to a position where it cannot engage the counters recording the votes on these issues. Thus, even though the voter may move the voting keys or selectors associated with the issues for which he is not qualified, these selections will not be recorded and, hence, will not affect the outcome of the election. However, this arrangement has the disadvantage that the voter is permitted to manipulate the voting keys or selectors even for the issues for which he is not qualified and, as a result, he has the illusion of having "voted" on these issues. He may feel that he has successfully voted on the latter and thus his confidence in the entire election process may be undermined. It would, therefore, be desirable to provide a classification lockout arrangement which actually locks the keys or selectors so that the voter can move only those associated with issues for which he is qualified, and the satisfaction of this desire constitutes one of the primary objects of the present invention.

A more general object of the present invention is to provide a voting machine having new and improved mechanism for programming the machine according to the classification of the voter.

Another object of the invention is to provide a voting machine using a card having appropriate indicia thereon indicative of the classification of the voter with the machine being automatically programmed in response to such indicia to lock the voting keys associated with those issues for which he is not qualified against movement.

A further object of the invention is to provide a voting machine of the character described employing a plurality of side by side columns each having several manually operable selectors slideable therealong for enabling the voter to make his selections together with means associated wtih each column for locking or unlocking the voting keys thereon so that the selectors of each column can be moved only if the column contains issues upon which the voter is qualified to cast his vote.

In the operation of voting machines of the type disclosed in the above-identified application Serial No. 120,-281 employing a scanning rail movable over the keys to actuate associated counters, it has been found that during the vote sensing sweep of the rail there is some possibility that the rail will move the voting keys from the position selected by the voter to another selecting position whereupon the counter associated with the latter position is actuated to register a vote for a candidate different from the one selected by the voter. Such an occurrence is extremely unlikely but obviously cannot be tolerated. The inadvertent movement of the voting keys might be caused, for example, by a tight counter which is difficult to operate so that the detent springs holding the voting keys are overcome before the counter is turned. It would, therefore, be desirable to provide a voting machine of the character described wherein the voting keys are positively locked during the vote sensing sweep of the scanning mechanism so that they cannot be inadvertently moved.

The invention, therefore, has for a further object the provision of a voting machine of the character described wherein the mechanism for locking and unlocking the keys according to the voter's classification also serves to lock all of the keys on all of the columns against movement during the vote sensing sweep of the scanning rail.

Another object of the invention is to provide a lockout mechanism of the type described which is constructed and arranged to permit return movement of the voting keys to their neutral positions during the key restoring sweep of the scanning rail.

It is a further object of the invention to provide a lockout mechanism movable between locked and unlocked positions which is in the unlocked position only during the relatively brief period when the voter is manipulating the voting keys to make his selections.

The foregoing and other objects are realized, according to the present invention, by providing a voting machine having a plurality of side by side vertical columns each divided into a number of selecting positions. The selecting positions of the different columns are aligned in a plurality of horizontal rows. Spaced apart stops in each column divide the column into several office groups with one or more voting keys or selectors being slideable along the column within each group from a neutral position located adjacent one of the stops to one of the selecting positions in order to permit the voter to make a choice between the candidates of each group. Detent springs are provided to hold the keys in the neutral and selecting positions.

Associated with each column is a multi-position selector switch having different positions respectively corresponding to the different classifications of each voter. Thus, the different issues to be decided by any particular class of voters are set up on one or more columns and the switch associated with each such column is set in the position corresponding to that voter class.

An identification card containing indicia representing the voter's classification is then inserted into the machine where a card sensing mechanism determines the voter's classification from the indicia and then renders effective only those columns containing issues upon which the voter is eligible to exercise his choice. The remaining columns are not actuated.

In one embodiment of the present invention the different columns are actuated by a hinged locking bar movable between locked and unlocked positions but normally held in the locked position to engage the detent springs of its associated column in order to hold all of the voting keys thereon. The locking bar for each column containing issues within the voter's classification is unlocked by the card sensing means, but the locking bars for the remaining columns are left in their locked positions, thus preventing any of the voting keys on the latter columns from being moved out of their neutral positions. Thus, the voter is effectively prevented from moving any of the voting keys for issues upon which he is not qualified.

In a second embodiment of the invention each detent spring has associated therewith a locking pawl mounted for pivotal movement upon the column. A locking bar or comb extends along each column and is slideably moved between locked and unlocked positions. The sliding locking bars are unlocked in the manner indicated above only on the columns containing issues within the voter's qualification. These bars are unlocked only during the voting operation when the keys are being manipulated. The bars lock the pawls to prevent downward movement of any of the voting keys, thus locking in neutral position all of the keys in the columns containing issues not within the voter's classification. In the latter columns the keys cannot be moved downwardly or out of their neutral positions.

In both embodiments of the invention after the voter has moved the voting keys to the selecting positions of his choice in the unlocked columns, a "Vote" switch is closed to move a scanning mechanism along all of the columns. A set of counters, one for each selecting position on the voting panel, registers the voter's choices. When the "Vote" switch is closed, the locking bars in both embodiments return to their locked positions so that all of the voting keys on all of the columns are held against downward movement during the vote sensing sweep of the scanning rail.

When the next voter inserts his identification card, the scanning mechanism is moved along the columns in the reverse direction from the vote sensing sweep, and at this time all of the voting keys which were previously moved are returned to their neutral positions. The locking bars in both embodiments are in their locked positions during the key restoring sweep but each includes means to permit the voting keys to be moved upwardly along the column so that they may be restored to their neutral positions.

The invention, both as to its organization and manner of operation, together with further objects and advantages thereof will best be understood by reference to the following detailed description taken in conjunction with the accompanying drawings wherein:

FIG. 1 is a fragmentary, front elevational view of a voting machine characterized by the features of the present invention;

FIG. 2 is an enlarged, fragmentary, sectional view taken along a line substantially corresponding to the line 2—2 in FIG. 1;

FIG. 3 is an enlarged, fragmentary, sectional view taken along a line corresponding substantially to the line 3—3 in FIG. 1;

FIG. 4 is a fragmentary, sectional view taken along a line corresponding substantially to the line 4—4 in FIG. 3;

FIG. 5 is a fragmentary, sectional view taken along a line corresponding substantially to the line 5—5 in FIG. 3;

FIG. 6 is a fragmentary, sectional view taken along a line substantially corresponding to the line 6—6 in FIG. 5;

FIGS. 7 and 8 are fragmentary, sectional views similar to FIG. 5 and show the operation of the locking bar of one of the columns during the key restoring sweep of the scanning rail;

FIG. 9 is a fragmentary, sectional view similar to FIG. 6 but shows the locking bar in its unlocked position;

FIG. 10 is a fragmentary, perspective view of a locking bar characterized by the features of the present invention;

FIG. 11 is a fragmentary, sectional view taken through one of the columns of a voting machine using another embodiment of the voter classification lockout mechanism characterized by the features of the present invention;

FIG. 12 is a fragmentary, sectional view taken along a line corresponding substantially to the line 12—12 in FIG. 11;

FIG. 13 is a perspective view, partly schematic showing the lockout mechanism of the voting machine illustrated in FIG. 11;

FIG. 14 is a perspective view showing one of the individual locking elements employed in the lockout mechanism illustrated in FIGS. 11 to 13;

FIG. 16 is a fragmentary, sectional view taken along a line corresponding substantially to the line 16—16 in FIG. 11;

Figure 19:
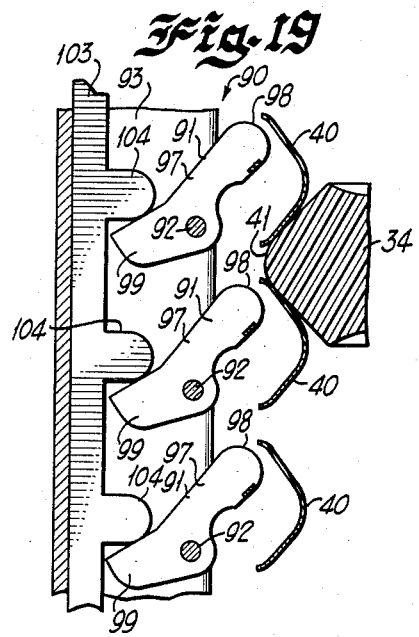
Figure 20:
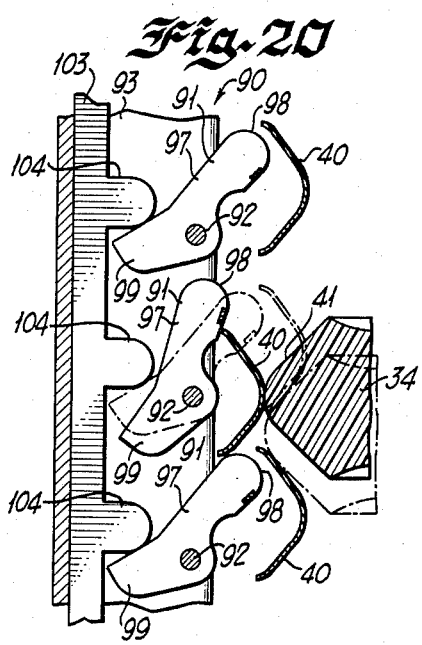
Figure 15:
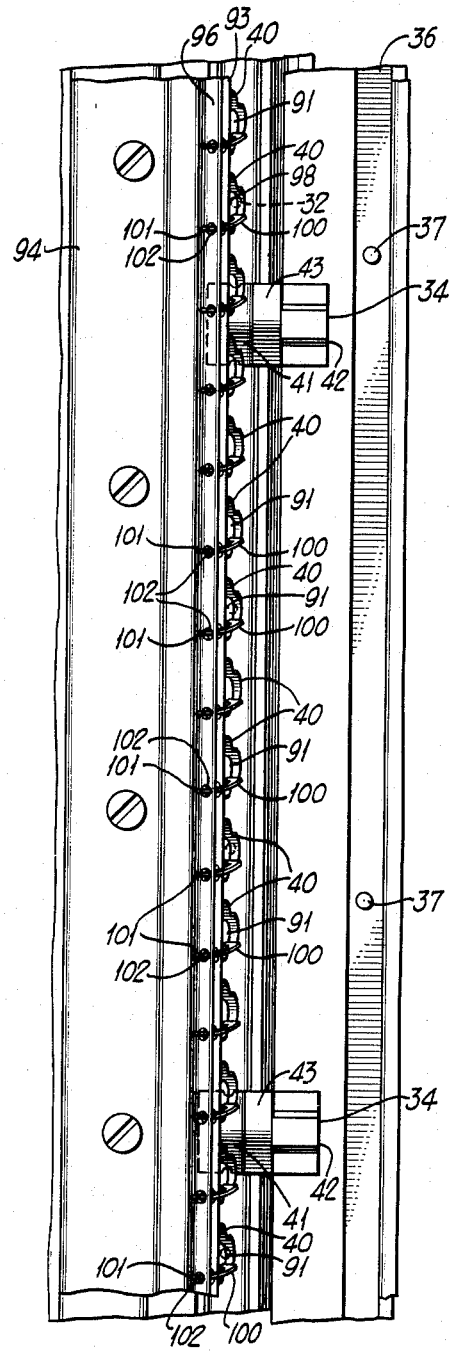
FIG. 15 is a fragmentary, sectional view taken along a line corresponding substantially to the line 15—15 in FIG. 11.

FIGS. 17 and 18 are views similar to FIG. 16 and show the sequence of operation of the lockout mechanism during restoring of the voting keys; and FIGS. 19 and 20 are views similar to FIGS. 17 and 18 but show the operation of the lockout mechanism during movement of a voting when a selection is being made by the voter.

Referring now to the drawings and first to the embodiment shown in FIGS. 1 to 10, a voting machine characterized by the features of the present invention is there identified generally by the reference numeral 20 and comprises a substantially enclosed housing 21 formed by a number of panels locked together in any suitable manner as, for example, by means of interlocks as described in detail and claimed in copending application Serial No. 120,249 of Hugh H. Bright et al. filed on June 28, 1961, now Patent No. 3,133,699 and assigned to the same assignee as the present invention. The housing 21 defines an upper, generally vertically extending voting panel section identified by the reference numeral 22 and a lower power supply section 23 extending forwardly from the upper section and forming a relatively low shelf 24 through which extends a manually operated "Vote" switch (not shown) which is accessible to the voter. The lower section of the housing beneath the shelf 37 may also contain a party vote mechanism (not shown) of the type described and claimed in copending application Serial No. 120,251 of Stanley W. Wilcox et al. filed June 28, 1961, now Patent No. 3,092,311 and assigned to the same assignee as the present invention.

The selections made by the voter are adapted to be registered upon counters 25 (FIG. 3) located on a counter panel 26 at the rear of the voting machine. The front face or panel of the upper section 22 is made up of a plurality of side by side vertically extending columns 22a, 22b, 22c, etc. As is best shown in FIGS. 3 and 6 of the drawings, each of the columns comprises an elongated member preferably formed of an extruded material such as aluminum. The extrusion is described in detail in the above-identified application Serial No. 120,281 and includes a channel 27 for receiving a printed or written candidate strip 28 containing different offices or propositions to be decided by the voter. Thus, for example, if the election is a national election, this strip may contain an office title such as "PRESIDENT" and therebeneath may appear the different candidates competing for this office. The office title and the candidates for the office will be referred to hereinafter as an "office group." However, it should be understood that the term "office group" may also refer to propositions on which a yes or no answer is required as, for example, on bond issues, constitutional amendments or the like. Each of the candidate positions in each office group will be referred to hereinafter as a selecting or voting position. Each of the channels 27 may also receive a transparent cover 29 overlying the printed candidate strip 28 for the purpose of preventing the latter strip from being marked or damaged by the voter using the machine.

A groove 30 is provided in the rear face of each column for receiving an elongated strip 31 having a series of vertically spaced openings therein accommodating office stops 32 which divide the different office groups of each column. Each office stop comprises a pin having a stem extending through one of the openings and protruding outwardly beyond the strip 31 and rearwardly of the column. Each column is further provided with an elongated, longitudinally extending guide rail 33 for accommodating one or more voting keys or selectors 34 which are slideable along the column to permit the voter to make his selections. In addition, each column is provided with a groove or slot 35 opening to the rear of the column for accommodating a second, perforated, elongated strip 36 carrying a plurality of detent release pins 37 located at spaced positions therealong to operate the key restoring mechanism in the manner described in detain in the copending application Serial No. 120,250, now Patent No. 3,095,142 of Edward J. Crossland et al. which is assigned to the same assignee as the present invention.

Each voting key 34 is adapted to be manually moved along its associated column between the two stops defining its office group but obviously the key cannot pass either of the stops. The key may be moved from the neutral or non-voting position located adjacent to the upper stop of its office group to any one of the selecting or voting positions of its group and as the key moves along the column an outer pointer or indicator 38 thereon passes over the names of the candidates on the strip 28. When the key reaches the position of the candidate selected by the voter, it is released. In a normal office group where only one selection can be made, the voter is provided with only one key and, as a consequence, it is not necessary to provide an interlock arrangement for preventing further voting in this office group. For group voting where more than one choice is to be exercised in a given office group, a number of voting keys are provided equal to the number of choices. If cumulative voting is not permitted, the names of the candidates in the latter group will appear only once and, hence, only one vote may be cast for any one candidate. However, if cumulative voting is permissible, that is, if the voter may cast more than one of his votes for a single candidate, then the names of the candidates will be listed in each office group more than once.

The number of selecting positions available in each of the columns is, of course, determined by the height of the column and the space occupied by each selecting position. Obviously, any suitable number of selecting positions may be provided but in one form of the present invention, thirty such positions were used. The selecting positions of the columns 22a, 22b, 22c etc. are horizontally aligned to form different horizontal rows on the front panel of the voting machine with each row corresponding to a transversely extending row of positions on the counter panel 26.

As is described in detail in the copending application Serial No. 120,281, now Pat. No. 3,108,744 the voting keys are held in the neutral and voting positions by detent springs 39 mounted on each column. The detent springs are stacked closely together along the length of the column and each includes a laterally extending curved detent finger carrying at its outer end a key engaging portion 40. Each of the key engaging portions 40 is disposed in the path of sliding movement of the voting keys on the column and is bent so that a key holding notch is formed between adjacent keys of the column. When a voting key is slid along the column to move over a detent finger, the finger is flexed rearwardly of the front panel 22 and if the key is stopped either at a voting position or at a neutral or non-voting position, it seats within one of the key holding notches and is thus resiliently held at the selected position with the adjacent detent fingers holding the key being disposed in their non-flexed positions. To provide a detent for each selecting position on the voting panel, the notches are separated by a distance corresponding to the width of one of the selecting positions and the detent fingers are so oriented with respect to the office stops that when a voting key is in its neutral position it is also seated within a notch.

The voting keys 34 are described in detail in the copending application Serial No. 120,281, now Pat. No. 3,108,744 identified above and each includes a curved detent engaging region 41 protruding rearwardly from the body portion of the key and shaped to flex the detent fingers during movement of the key along the column. The rearward portion of each key is also provided with a tooth 42 for use in restoring the key to its neutral position after the vote is cast. Finally, the rearward portion of the key is provided with a curved surface portion 43 for engaging the counter actuating mechanism.

After the voter has made his selections upon the voting panel of the machine, his choices are adapted to be registered upon the counters 25. As is shown in FIG. 3, the counter panel 26 extends along the rear of the voting machine within the housing 21 and generally parallel to the front panel 22. The panel 26 comprises a large flat plate carrying a plurality of elongated, spaced apart, parallel vertical ribs 44 defining a plurality of columns equal in number to the number of columns 22a, 22b, 22c, etc. of the front panel 22. As was indicated above, the panel 26 is adapted to support a plurality of the detachable counter devices 25, one such counter being used for each voting or selecting position employed for voting on the front panel 22. To this end, the panel 26 has a number of counter receiving positions thereon for receiving the counters and prior to the election counters are assembled on the panel only at receiving positions corresponding to the voting or selecting positions to be used during the election. No counters are inserted at positions corresponding to the neutral or non-voting positions of the voting keys and none are mounted at positions corresponding to the vacant positions on the front panel not used for the election. Along each column of the counter panel are provided pairs of holes 26a and 26b with the different pairs being spaced apart vertically and with each pair being adapted to receive feet 25a formed on each of the detachable plug-in counters 25. Each counter is of the type described and claimed in copending application Serial No. 120,241 of Hugh H. Bright filed June 28, 1961, and assigned to the same assignee as the present invention and, as a result, these counters will not be described in detail. Each column on the counter panel is also provided with an elongated vertical slot 45 formed in the plate for receiving counter operating ratchets 46 (FIG. 3) of all of the counters mounted along that column. Elongated detent springs 47 are carried by the panel ribs 44 and each has a plurality of spring fingers cooperating with tabs 48 formed on opposite sides of the counter casing to hold the counters in position; each counter being held by one pair of spring fingers. Each counter is inserted into position on the counter panel by holding its casing at the top and bottom between the thumb and forefinger and by then pushing the counter past the detent spring fingers until the counter ratchet 46 extends through the slot 45 with the feet 25a fitting into one pair of the openings 26a and 26b. The detent spring fingers 47 snap over the tabs 48 to hold the counter in position.

The vote registering operation is initiated by the actuation of the manually operated "Vote" switch (not shown) by the voter after he has completed his selections. The switch is effective to complete an electrical circuit (not shown but described in the above-identified McCaskill application Serial No. 120,214) to a drive motor having its output shaft 49 (FIG. 1) connected through suitable reduction gearing and through a pair of sprocket and chain assemblies 50 to drive a scanning mechanism indicated generally by the reference numeral 51. The assemblies 50 extend along opposed sides of the housing 31 so that only one of them is shown in FIG. 1. When the "Vote" switch is operated, the scanning mechanism is located at the top of the voting machine and, hence, it is swept along the rear of the voting panel in a sensing or vote detecting direction and remains at the bottom of the panel until it is returned to the top at the start of the next voting cycle by the insertion of a properly positioned, valid voter identification card as is disclosed in the copending McCaskill application Serial No. 120,214 referred to above. During the return sweep of the scanning mechanism 51, the voting keys 34 are all returned from their voting positions to their neutral or non-voting positions ready for the next voter's selections. The drive for the scanning mechanism is described in detail in the copending application Serial No. 120,281, now Pat. No. 3,108,744.

As is best shown in FIG. 3, the scanning mechanism itself comprises a horizontal rail 52 having its opposed ends mounted for turning movement upon carriage assemblies respectively carried by the vertically extending chains of the assemblies 50. The carriage assemblies are fixedly secured to the chains and are guided for vertical movement within suitable fixed guide channels provided along the sides of the voting machine housing 21.

Since the voting keys are retained in their voting positions on the front panel following completion of the vote registering operation, it is desirable, for the purpose of preserving the secrecy of the ballot, to cover the panel and the keys so that the key positions cannot be detected by the next voter using the machine. To this end, a flexible curtain or cover 59 (FIG. 1) may be lowered over the front panel 22 when the scanning mechanism 51 makes its vote sensing sweep. This curtain, when retracted, is stored within a curtain containing chamber at the rear of the voting panel section 22 but is extended by the downward movement of the scanning mechanism 51 to cover the front panel as is described in detail in the above-identified application Serial No. 120,281.

For the purpose of detecting the positions of the actuated or voted keys, that is, the keys which have been moved from a neutral position to a voting position, and for actuating those counters 25 corresponding to the positions of the voted keys, the rail 52 carries a plurality of spaced apart combined key wipers and counter actuating devices 53, there being one of these for each of the columns 22a, 22b, 22c, etc. The devices 53 are described in detail in the copending application Serial No. 120,281 but, briefly, each comprises an interposer arm 54 extending through a transverse bore in the rail 51 and suspended upon the latter rail for limited movement longitudinally of the bore by means of leaf springs 55 and 56.

During the vote sensing sweep of the scanning mechanism 51, the forward or wiping end 57 of the interposer arm is positioned to engage the curved area 43 on each of the voting keys 34 of its associated column. Thus, when the scanning mechanism 51 is moved downwardly along the rear of the voting panel, the interposer arm 54 is moved upwardly as viewed in FIG. 3 each time that the wiping end 57 engages a voting key 34, the interposer arm being returned by the springs 55 and 56 as soon as the wiping end has moved past the key. The described movement of the arm 54 is used to actuate the counters 25 since the rearward end of the arm 54 is in engagement with a counter actuating arm 58 having a hooked end which is adapted to engage and turn the ratchet 46 of any counter 25 located in a position on the panel 26 corresponding to the position of a voted key.

When the scanning rail 52 approaches the end of its vote detecting sweep, it is turned about its axis in order to condition it for the upward key restoring sweep. The turning of the rail moves the interposers or wipers to positions where they cannot engage the voting keys during the return of the rail. However, when the rail 52 is turned, a plurality of key restoring devices 60, one for each of the counter actuating devices 53, are positioned to engage the tooth 42 on each voting key as the rail is raised. One such key restoring device is provided for each column containing voting keys and each device is effective to lift all of the voting keys in its associated column from the detent fingers holding them in the voting positions and to slide each key upwardly along the column until it is returned to its neutral position where its upward movement is limited by one of the office stops 32. Each key restoring device includes a toothed cog 61 mounted for rotation upon an L-shaped bracket 62 secured to the rail 52 and each cog is provided with any desired number of teeth provided only that the interdental spaces between adjacent teeth is sufficient to permit the cog to turn over the tooth 42. Formed integral with each cog at one side thereof is a toothed detent wheel 63 cooperating with a detent 64 to positively lock the cog in position while the latter is performing its key lifting or restoring function. The detent 64 comprises a pawl extending transversely from a stub shaft mounted on the bracket 62 and the free end of the pawl engages the periphery of the detent wheel 63. The shaft also supports a detent release arm 65 disposed to successively engage all of the release pins 37 of the associated column during the key restoring sweep of the scanning mechanism 51 as is described in detail in the copending application Serial No. 120,281. The detents of the different key restoring devices 60 operate independently of each other and each is effective to prevent turning of its associated cog 61 until it is released by engagement of its release arm 65 with one of the pins 37. Thus, the positions of the release pins 37 along the columns determine when the cogs 61 will be released to turn. When the scanning rail 52 is raised at the start of the key restoring sweep, all of the cogs 61 will be held against rotation with one of the cog teeth extending substantially horizontally towards the front panel and in position to engage the tooth 42 on the lowermost voting key in the associated column. Thus, when the latter key is engaged by the horizontal cog tooth, the continued upward movement of the rail 52 is effective to lift the key and this action occurs along each column although obviously the lowermost voting keys of the different columns are not likely to be located in the same voting positions and, as a result, the key restoring devices 60 usually engage these lowermost keys at different times. In any event, each key is lifted until it approaches the neutral position of its office group where it it will rest either against one of the office stops 32 or against another key in the neutral position. The release pins 37 are disposed along the column at positions corresponding to the neutral positions of the keys and, hence, when each key approaches its neutral position, the release arm 65 of its associated key restoring device engages a pin 37 whereupon the detent wheel 63 is released, thus permitting the cog 61 to turn over the tooth 42 on the voting key to pass over this key. After each voting key has been raised to seat against its stop (or against another key in neutral position), it is held in the neutral position by engagement of its portion 41 with the detent spring notch corresponding to its neutral position. When the scanning rail approaches the top of the panel at the end of its key restoring sweep, it is turned from the restoring position back to the scanning or vote sensing position shown in FIG. 1.

In accordance with the present invention each column is also provided with means for holding the voting keys against sliding movement. This locking means comprises a locking bar construction 70 mounted at the rear of each column 22a, 22b, 22c, etc. and supported for pivotal movement between a locking position (FIG. 6) wherein it is effective to engage the detent springs 39 along its column to hold the voting keys in a released or unlocked position (FIG. 9) wherein the detent springs are free to flex to permit movement of the voting keys. More specifically, the locking bar construction comprises a first fixed, elongated strap 71 mounted in fixed position upon a spacer block 72 suitably secured to the rear of the column extrusion. The hinge strap 71 extends longitudinally along the rear of the column and is provided with a plurality of spaced knuckles 73 for receiving a hinge pin 74. The hinge pin supports a U-shaped elongated leaf 75 which is adapted to be pivoted between the locked position shown in FIG. 6 and the unlocked position shown in FIG. 9. Any suitable means may be provided for moving the leaf 75 between these positions. For example, a pair of solenoids may be associated with each column and connected to the leaf in such manner that when one solenoid is energized the leaf is in the locked position while energization of the other solenoid causes the leaf to pivot to the unlocked position. Alternatively a motor may be connected through electrical clutches respectively associated with different columns to pivot the leaves 75 between their locked and unlocked positions. To simplify the disclosure in the present application, a single spring biased solenoid 76 (FIG. 10) is illustrated as being connected to each leaf 75. The solenoid armature 77 is so biased that normally the hinge leaf 75 is in the locked position but when the solenoid is energized its armature pivots the leaf to the unlocked position. Suitable detents (not shown) are preferably provided to hold the locking means both in the locked and unlocked positions but such detents may be of any conventional construction. As is best shown in FIGS. 2 and 5, each U-shaped hinge leaf supports a locking bar 78 having a plurality of outwardly projecting fingers 79 thereon, the space between adjacent fingers being equal to that between adjacent spring detents 39. The bar 78 is provided with spaced ears 80 each having an aperture therein for accommodating a pin 81 affixed to the bar. The latter pin is accommodated within inclined slots 82 formed in projections 83 extending outwardly from the legs of the U-shaped leaf 75. The slots 82 are inclined downwardly and outwardly at about 45° from the longitudinal axis of the hinge pin 74 and they permit limited movement of the bar 78 within the channel of the U-shaped leaf for a purpose which will become evident as the description proceeds. As is shown in FIG. 5, the locking bar 78 is normally biased downwardly and away from the leaf 75 by means of a plurality of spaced leaf springs 84 each having one end wrapped around a support pin 85 and having its other end curved to form a wiper portion 86 bearing against the side edge of the bar 78. The center portion 87 of each spring 84 is bent to rest against one of the knuckles 73 of the hinge strap 71. The springs 84 normally hold the locking bar 78 in the position shown in FIG. 5 with each of the pins 81 seating against the bottom rounded ends of its associated slots 82. Thus, when the leaf 75 is in the locked position, each of the fingers 79 of the locking bar 78 seats within one of the curved wiping portions 40 of a detent spring 39.

As is described in the above-identified application Serial No. 120,214, now Patent No. 3,098,607 of Robert McCaskill, the voting machine is preferably connected by means of a cable (not shown) to a remote automatic voter classification unit (also not shown) for receiving an identification card having prerecorded information such as punched holes identifying the classification of the voter. The structure shown in the McCaskill application Serial No. 120,214 may be used with the voting machine 20 of the present invention, but a few relatively minor changes must be made in the electrical control circuit to change the sequence of operation in the manner described below. Since the nature of the changes required will become obvious from the following description, the modified electrical circuit is not illustrated nor described in detail. In the operation of the apparatus disclosed in application Serial No. 120,214 the solenoids for turning the counter actuators to activate the different columns according to the voter's classification are energized as soon as a valid card is properly inserted. In the apparatus of the present invention the counter actuators are not pivoted or turned and, as a result, their construction is somewhat simpler than that of the earlier machine. In addition the solenoids 76 used in the present machine are not operated until the key restoring sweep of the scanning rail has been completed. Thus, during the key restoring sweep, none of the solenoids 76 is energized so that all of the locking bar constructions 70 are in their locked positions shown in FIGS. 5, 6, 7 and 8. As the scanning rail 52 is raised to lift the voting keys 34 in the manner described above, each key moves from the position shown in FIG. 7 to that shown in FIG. 8. Thus, as is shown in FIG. 7 the curved portion 41 of the key engages the curved portion 40 of the detent spring 39. Continued upward movement of the scanning rail causes the voting key to flex the detent spring about a vertical axis to move it from the position shown in solid lines in FIG. 6 to that shown in broken lines. At the same time the curved portion 40 of the spring is raised slightly from the position shown in broken lines in FIG. 8 to that shown in solid lines, thus permitting the key to be moved upwardly past the detent springs. This action continues as each detent spring is encountered until the key is restored to its neutral position whereupon the key restoring cog 61 is released in the manner previously described. The flexing of the detent springs 39 is made possible by the movement of the locking bar 78 within the leaf 75. Thus, as the spring portion 40 is moved inwardly and upwardly, the pins 81 on the locking bar move upwardly within the guide slots 82 and the wiping ends 86 of the springs 84 are flexed to move from the position shown in broken lines in FIG. 8 to that shown in solid lines. As soon as the voting key passes over the curved spring portion 40 the springs 84 return the locking bar 78 to the lower position shown in FIG. 5. The locking bars 78 prevent downward movement of the voting keys and, as a result, avoid the possibility that the voter may reach underneath the curtain 59 (either with a tool or otherwise) to hold the voting keys during the key restoring sweep of the scanning rail. After the voting keys have been restored to neutral position, they are securely locked between the office stops 32 and the locking means 70 so that they cannot be moved. In this connection it will be observed that the inclination of the slots 82 is such that the pins 81 cannot be moved upwardly therein by application of a downwardly directed force on the voting keys.

When the scanning rail has reached the end of the key restoring sweep at the top of the voting machine housing 21, it actuates a limit switch in an electrical circuit controlling the solenoids 76 of all of the columns. The sensing means in the remote classification unit is like that shown in the McCaskill application Serial No. 120,214 and it detects the voter's classification or eligibility from the pre-punched information on his identification card. This sensing means permits energization of only those solenoids associated with columns containing issues upon which the voter is eligible to make a choice. No other solenoids can be energized and, hence, their associated locking means remain locked to prevent movement of any of their voting keys from the neutral positions. The solenoids 76 associated with the activated columns containing the issues for selection by the voter are energized to pivot the locking means 70 of these columns to the unlocked positions, thus releasing all of the voting keys on these particular columns to permit free movement by the voter. The columns are coordinated with the classification by means of a manually operated switch (not shown) associated with each column in the manner described in the McCaskill application Serial No. 120,214 and in the copending application Serial No. 74,887 referred to above. As is there described, the switches may be used to render any desired group of columns effective for a given voter classification.

After the scanning rail and the curtain have been raised and after the proper columns have been activated, the voter proceeds to make his selections on the front panel by manipulating the sliding voting keys or selectors and after he is satisfied with the selections made, he depresses the "Vote" switch which is effective to deenergize all of the solenoids 76, thus returning all of the locking means 70 to the locked position so that all of the keys on all columns are locked during the vote sensing sweep of the scanning rail. Actuation of the "Vote" switch is also effective to drop the voter's identification card from the card holder in the remote unit in the manner described in the above identified application Serial No. 120,214. The "Vote" switch also completes a circuit to the drive mechanism for the scanning rail to drive the latter from the top of the voting machine 20 to the bottom and, at the same time, to lower the curtain 59 over the front panel. During the movement of the scanning rail in its vote sensing sweep, the counters are actuated to record the voter's selections and the voting keys 34 are locked to prevent inadvertent movement of any of the keys over the detent springs 39 by the scanning rail. When the scanning rail has completed its vote sensing sweep, a limit switch is actuated to terminate the drive to the scanning rail and, at the same time, to pivot the card holder of the remote unit back to the original card receiving position awaiting receipt of the identification card from the next succeeding voter to use the machine.

A second embodiment of the invention is shown in FIGS. 11 to 20, inclusive, wherein there is shown a voting machine generally similar to that described above but employing another form of classification lockout means 90 characterized by the features of the present invention. The lockout means there shown differs from the means 70 described above in that it employs a separate locking member 91 for each voting key position (both the neutral and the voting or selecting positions). Since these separate locking members are operated individually and in sequence during the key restoring operation, the force required to restore the keys is much less than that of the first embodiment where the scanning mechanism must force the locking bar of each column inwardly against its biasing springs as each key along the column is moved. Moreover, in the first embodiment, all of the voting keys along a column are released when the sliding bar 78 is moved inwardly during restoration of a voting key and, as a consequence, it would be possible to move one of the lower keys out of the neutral or non-voting position if one were to apply a downwardly directed force on one or more of these keys at the precise instant when the locking bar 78 is moved inwardly by restoration of one of the upper keys of the column. Such movement would, of course, permit the voter to cast votes on issues not within his classification. However, the locking means 90 shown in FIGS. 11 to 20 effectively avoids this possibility by locking all of the keys individually so that release of one of them during key restoring does not release the remaining keys along the column. To this end, each of the locking members or pawls 91 is mounted for pivotal movement upon a pin 92 secured to an extrusion 93 carried by the column extrusion. The column extrusion is identical to that described above in conjunction with the first embodiment and, hence, will not be described in detail. The extrusion 93 includes a body portion 94 secured to the column, for example, by machine screws, and means defining an elongated channel 95 (FIG. 13) extending longitudinally along the column and having its open end adjacent the detent springs 39. A rib 96 extends along one side of the extrusion 93 for a purpose which will become evident as the description proceeds. The pins 92 are suitably secured within aligned openings in the sides of the channel 95 and are so spaced that a locking member 91 lies adjacent to and engages the curved portion 40 of an associated detent spring 39. Each locking member is formed of a substantially non-compressible material such as "Delrin," a trademark of E. I. du Pont de Nemours and Co., Inc. for an acetyl resin of composition $(-OCH_2-)_n$ derived by the polymerization of formaldehyde, and each has a relatively thick body portion 97 dimensioned to fit loosely within the channel 95 with a rounded outer end 98 seating within the curved portion 40 of its associated detent spring. The inner end 99 of the body portion 97 extends towards the bottom of the channel 95. To provide a biasing means for urging the locking member 91 into engagement with its associated detent spring 39, each of the body portions 97 has integrally formed therewith a thin, resilient, generally L-shaped extension leaf 100 having a leg portion 101 extending along the outside of one leg of the channel 95. The free end of the leg portion 101 is inserted into an opening 102 formed in the rib 96 of the extrusion, one such opening obviously being provided for each locking member 91. The leaf 100 applies a force on the locking member 91 in a direction to resist deflection of the detent spring 39 as the voting key is moved along the column.

To provide structure for selectively locking the members 91 of each column to prohibit downward movement of the voting keys, a locking bar or comb 103 is mounted for sliding vertical movement within the channel 95 of each of the extrusions 93. The comb is provided with a plurality of fingers 104, one for each locking member and is suitably attached at one end, i.e., the lower end as shown in FIG. 13 to the armature of a conventional pull-type solenoid 105. One such solenoid is provided for each column and each solenoid armature is biased by a spring (not shown) so that the comb 103 is normally in the raised position and each of the pawls 91 is pivoted about its pin 92 by its leaf 100 in a clockwise direction as viewed in FIG. 16. In this position, which will be referred to as the locked position, the leaf 100 of each pawl 91 urges the latter into engagement with the curved portion 40 of the detent spring. The voting key 34 cannot be moved downwardly because the pivot pin 92 for the pawl is so located relative to the detent spring 39 that a downwardly directed force on the voting key does not provide a force component tending to pivot the pawl towards its unlocked position. Thus, all of the pawls 91 in the locked columns hold the voting keys along that column in their neutral positions.

When the solenoid 105 of one column is energized its armature draws the comb 103 downwardly to the unlocked position shown in FIGS. 19 and 20 where the fingers 104 engage the ends 99 of all of the pawls 91 along the column. The pawls 91 are thus pivoted to the position shown in FIG. 19 whereupon the rounded outer ends 98 are moved away from the centers of the detent spring portions 40 so that all of the detent springs along the column can be flexed if the voting keys are moved past these springs. Thus, when one of the solenoids 105 is energized its associated column is unlocked and the voter may move the voting keys 34 of that column. The solenoids 105 are energized in accordance with the voter's classification as identified on his card. However, as was indicated above all of the solenoids are de-energized during the key restoring sweep of the scanning rail so that all of the columns are locked. During key restoring the voting keys are lifted by the scanning rail to flex the detent springs inwardly and upwardly thus pivoting the pawls 91 in a counterclockwise direction, as viewed in FIG. 18 from the position shown in broken lines to that shown in solid lines.

As the voting key is lifted from the position shown in FIG. 17 to that shown in FIG. 18 it moves over a curved portion 40 of a detent spring to flex the spring upwardly (FIG. 18) and inwardly. The described movement of the detent spring pivots the pawl 91 against the biasing leaf 100 and the latter leaf restores the pawl to the locked position as soon as the voting key has moved past the associated detent spring 39, thus locking the key against downward movement. Therefore, none of the voting keys can be manually moved downwardly along the column during the key restoring operation because each detent spring is individually locked.

The solenoids 105 of the columns containing issues within the voter's classification are energized at the completion of the key restoring sweep so that the keys in these columns are released for manipulation by the voter. All other columns remain locked to hold the keys there along in the neutral positions, thus preventing the voter from casting votes on issues for which he is not qualified. All of the solenoids 105 are de-energized when the "Vote" switch is depressed so that all of the voting keys are locked during the vote sensing sweep of the scanning rail with all of the advantages discussed above. Thus, during the sensing sweep the keys cannot be moved downwardly along the columns even if a tight counter spring or the like is encountered by the scanning rail.

In view of the foregoing description, it will be observed that both embodiments of the invention are effective to accomplish the enumerated objects of the invention. The classification lockout means is effective and substantially foolproof in operation but is, at the same time, relatively small, light and compact so that it can be easily assembled on existing voting machines. In both embodiments the actuating solenoids are energized only during the brief interval when the voter is actually making his selections and at all other times the voting keys are locked. Since the keys are locked during the vote sensing sweep of the scanning rail, the possibility of moving the keys with the rail is avoided, thus eliminating a possible source of error. Since the voter can move only those keys associated with issues for which he is qualified, he has no illusion that he has successfully overvoted the machine.

While particular embodiments of the invention have been illustrated and described it will be apparent that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a voting machine the combination of means defining a plurality of columns each containing a plurality of slideable manually operable selectors each movable longitudinally of the column from a non-voting position to a plurality of different voting positions for permitting the voter to make his selections, said columns containing different issues to be passed upon by the voter, means associated with each column for simultaneously locking all of the selectors of that column against sliding movement to prevent manual movement of any of the selectors of that column by the voter, and means for rendering ineffective the locking means associated with those columns containing issues upon which the voter is eligible to vote so that the selectors in those columns are released to permit manual sliding movement.

2. The apparatus defined by claim 1 wherein each locking means comprises a structure extending along its column and movable between locked and unlocked positions, said structure being disposed when in the locking position in the path of sliding movement of the selectors in order to hold the selectors against sliding movement and being disposed when in the unlocked position to release the selectors for manual sliding movement.

3. The apparatus defined by claim 2 wherein said structure is mounted for pivotal movement upon its associated column between the locked and unlocked positions.

4. In a voting machine the combination of means defining a plurality of columns each containing a plurality of manually operable selectors slideable longitudinally thereof for permitting the voter to make his selections, said columns containing different issues to be passed upon by the voter, each selector being manually slideable along its associated columns from a non-voting position to a voting position, means including at least one movable scanning device movable along the columns in one direction for simultaneously scanning all of said columns to determine which selectors have been moved to a selecting position and movable along the columns in the opposite direction, means for registering the voter's selections as said scanning device is moved in said one direction, means on said scanning device for returning all of the selectors to their non-voting positions when said scanning device is moved in said opposite direction, means associated with each column for simultaneously locking all of the selectors of that column against movement in a direction away from their non-voting positions during the movement of the scanning device in said opposite direction, and means for rendering ineffective the locking means associated with those columns containing issues upon which the voter is eligible to vote.

5. The apparatus defined by claim 4 wherein each locking means comprises structure extending along its column and movable between locked and unlocked positions, said structure being disposed when in the locked position in the path of the selectors in order to hold the selectors against sliding movement and being disposed when in the unlocked position to release the selectors for manual sliding movement.

6. The apparatus defined by claim 5 wherein said structure is mounted for pivotal movement upon its associated column between the locked and unlocked positions.

7. The apparatus defined by claim 5 wherein said structure includes a first member mounted for limited movement with respect to a second member, said first and second members being movable in unison between the locked and unlocked positions, said first member being moved with respect to said second member by movement of the selectors during return movement to their non-voting positions by the scanning device, thereby to permit the scanning device to return the selectors from the voting positions to the non-voting positions.

8. The apparatus defined by claim 6 wherein said structure includes first and second members, the first member being mounted for pivotal movement upon its column, and means mounting the second member for limited sliding movement relative to the first member between extended and retracted positions, said first and second members being pivoted in unison between the locked and unlocked positions, said second member being retracted slideably with respect to the first member by movement of the selectors during return movement to their non-voting positions by the scanning device, thereby to permit the scanning device to return the selectors from the voting positions to the non-voting positions.

9. The apparatus defined by claim 8 which further includes resilient means acting between the first and second members to normally urge the second member towards the extended position.

10. The apparatus defined by claim 4 wherein the locking means comprises a locking member for each of the voting and non-voting positions, each of said members being movable in response to sliding movement of the selectors, and a locking structure associated with each column and movable between a first position wherein the locking members of its column hold the selectors against sliding movement and a second position wherein all of the selectors of its column are released for sliding movement.

11. The apparatus defined by claim 10 wherein each locking member comprises a pawl pivotally mounted on the column and biasing means acting to urge the pawl towards a locking position, each locking structure including a bar slideable along its column to control the pivoting movement of the pawls of that column.

12. In a voting machine the combination of means defining a plurality of columns each containing a number of stops defining a plurality of office groups, each office group containing a number of selecting positions, manually operable selectors, at least one for each office group, mounted upon each column and each slideable longitudinally along said column from a neutral position adjacent one of said stops to one of the selecting positions whereby the voter makes his selections, a plurality of detent springs for resiliently holding the selectors in the neutral and selecting positions, means including a scanning device movable along said columns in one direction for simultaneously scanning all of said columns to determine which of the selectors has been moved to a selecting position by the voter and movable along said columns in the reverse direction, means for registering the voter's selection as said scanning device is moved in said one direction, means on said scanning device for returning all of the selectors to their non-voting positions when said scanning device is moved in said reverse direction, means associated with each column for simultaneously locking all of the selectors of that column against movement in a direction away from their neutral positions during the movement of said scanning device in said reverse direction, and means for rendering ineffective the locking means associated with those columns containing issues upon which the voter is eligible to vote, whereby the selectors of those columns may be manually moved along the columns from the non-voting position to the voting position.

13. The apparatus defined by claim 12 wherein each locking means comprises a structure extending along its column and movable between locked and unlocked positions, said structure being disposed when in the locking position in the path of sliding movement of the selectors in order to hold the selectors against sliding movement and being disposed when in the unlocked position to release the selectors for manual sliding movement.

14. The apparatus defined by claim 13 wherein said structure is mounted for pivotal movement upon its associated column between the locked and unlocked positions.

15. The apparatus defined by claim 13 wherein said structure includes a first member mounted for limited movement with respect to a second member, said first and second members being movable in unison between the locked and unlocked positions, said first member engaging the detent springs of its column and being moved with respect to said second member by movement of the selectors during return movement to neutral position by the scanning device, thereby to permit the scanning device to return the selectors from the voting positions to the non-voting positions.

16. The apparatus defined by claim 14 wherein said structure includes first and second members, the first member being mounted for pivotal movement upon its column, and means mounting the second member for limited sliding movement relative to the first member between extended and retracted positions, said first and second members being pivoted in unison between the locked and unlocked positions, said second member engaging the detent springs of its column and being retracted slideably with respect to the first member by movement of the selectors during return movement to neutral position by the scanning device, thereby to permit the scanning device to return the selectors from the voting positions to the non-voting positions.

17. The apparatus defined by claim 12 wherein the locking means comprises a locking member engaging each detent spring and movable when said spring is flexed by movement of the voting keys, and a locking structure associated with each column and movable between a first position wherein the selectors of its column are held against sliding movement and a second position wherein all of the selectors of its column are released for sliding movement.

18. The apparatus defined by claim 17 wherein the locking member comprises a pawl pivotally mounted in the column and biasing means acting to urge the pawl against one of the detent springs, each locking structure including a bar slideable along its column to control the pivoting movement of the pawls of that column.

19. In a voting machine the combination of means defining a plurality of columns each containing a number of stops defining a plurality of office groups, each office group containing a number of selecting positions, manually operable selectors, at least one for each office group, mounted upon each column and each slideable longitudinally along said column from a neutral position adjacent one of said stops to one of the selecting positions whereby the voter makes his selections, a plurality of detent springs for resiliently holding the selectors in the neutral and selecting positions, means associated with each column for simultaneously locking all of the selectors in that column against sliding movement, and means for rendering ineffective the locking means associated with those columns containing issues upon which the voter is eligible to vote, thereby to release the selectors of those columns for manual sliding movement.

20. The apparatus defined by claim 19 wherein each locking means comprises a structure extending along its column and movable between locked and unlocked positions, said structure being disposed when in the locked position in the path of sliding movement of the selectors in order to hold the selectors against sliding movement and being disposed when in the unlocked position to release the selectors for manual sliding movement.

21. The apparatus defined by claim 19 wherein the locking means comprises a locking member engaging each detent spring and movable when said spring is flexed by movement of the voting keys, and a locking structure associated with each column and movable between a first position wherein the selectors of its column are held against sliding movement and a second position wherein all of the selectors of its column are released for sliding movement.

22. The apparatus defined by claim 21 wherein the locking member comprises a pawl pivotally mounted on the column and biasing means acting to urge the pawl against one of the detent springs, each locking structure including a bar slideable along its column to control the pivoting movement of the pawls of that column.

23. In a voting machine the combination of support means, a plurality of manually operable selectors each slideable along said support means for permitting the voter to make his selections, means for limiting the sliding movement of each selector so that each is effective to make a selection within an office group, each selector being manually slideable from a plurality of different non-voting positions in its office group to voting positions, means for locking all of the selectors of all office groups against sliding movement from their non-voting positions, and means for rendering ineffective the locking means associated with those office groups containing issues upon which the voter is eligible to vote, thereby to release the selectors of those groups for manual sliding movement.

24. In a voting machine the combination of support means, a plurality of manually operable selectors slideable along said support means for permitting the voter to make his selections, means for limiting the sliding movement of each selector so that it is effective to make a selection within an office group, each selector being manually slideable from a non-voting position in its office group to a plurality of different voting positions, resilient means for holding each selector in its voting and non-voting positions, means for locking all of the selectors of all office groups against sliding movement from their non-voting positions, and means for rendering ineffective the locking means associated with office groups containing issues upon which the voter is eligible to vote, thereby to release the selectors of those groups for manual sliding movement.

25. The apparatus defined by claim 24 wherein the locking means comprises structure associated with each office group movable from a locking position wherein it engages the resilient means to prevent sliding movement of the selectors of that office group to an unlocked position wherein the selector of that group is released for manual sliding movement.

26. The apparatus defined by claim 4 wherein means are provided for rendering said locking means effective to lock all of the selectors of all columns against sliding movement during the movement of the scanning device in said one direction.

27. The apparatus defined by claim 12 wherein means are provided for rendering said locking means effective to lock all of the selectors of all columns against sliding movement during the movement of the scanning device in said one direction.

28. In a voting machine, the combination of means defining a plurality of columns each containing a plurality of manually operable selectors slideable longitudinally thereof for permitting the voter to make his selections, said columns containing different issues to be passed upon by the voter, each selector being manually slideable from a non-voting position to a voting position, means including at least one movable scanning device movable along the columns for scanning all of said columns to determine which selectors have been moved to a selecting position, means for registering the voter's selections as said scanning device is moved, means associated with each column for positively and simultaneously locking all of the selectors of that column against sliding movement, means for rendering the locking means of all columns effective to prevent sliding movement of all of the selectors during the movement of said scanning device, and means for rendering ineffective the locking means associated with those columns containing issues upon which the voter is eligible to vote, whereby the selectors of those columns may be manually moved along the columns from the non-voting position to the voting position.

29. The apparatus defined by claim 28 wherein each locking means comprises structure extending along its columns and movable between locked and unlocked positions, said structure being disposed when in the locked position in the path of sliding movement of the selectors in order to hold the selectors against sliding movement and being disposed when in the unlocked position to release the selectors for manual sliding movement.

30. The apparatus defined by claim 29 wherein said structure is mounted for pivotal movement upon its associated column between the locked and unlocked positions.

31. The apparatus defined by claim 29 wherein said structure includes a first member mounted for limited movement with respect to a second member, said first and second members being movable in unison between the locked and unlocked positions, said first member being movable with respect to said second member by movement of the selectors.

32. The apparatus defined by claim 30 wherein said structure includes first and second members, the first member being mounted for pivotal movement upon its column, and means mounting the second member for limited sliding movement relative to the first member between extended and retracted positions, said first and second members being pivoted in unison between the locked and unlocked positions, said second member being retracted slideably with respect to the first member by movement of the selectors.

33. The apparatus defined by claim 32 which further includes resilient means acting between the first and second members to normally urge the second member towards the extended position.

34. The apparatus defined by claim 28 wherein the locking means comprises a locking member for each of the voting and non-voting positions, each of said members being movable in response to sliding movement of the selectors, and a locking structure associated with each column and movable between a first position wherein the locking members of its column hold the selectors against sliding movement and a second position wherein all of the selectors of its column are released for sliding movement.

35. The apparatus defined by claim 34 wherein each locking member comprises a pawl pivotally mounted on the column and biasing means acting to urge the pawl towards a locking position, each locking structure including a bar slideable along its column to control the pivoting movement of the pawls of that column.

36. In a voting machine the combination of means defining a plurality of columns each containing a number of stops defining a plurality of office groups, each office group containing a number of selecting positions, manually operable selectors, at least one for each office group, mounted upon each column and each slideable longitudinally along said column from a neutral position adjacent one of said stops to one of the selecting positions whereby the voter makes his selections, a plurality of detent springs for resiliently holding the selectors in the neutral and selecting positions, means including a scanning device movable along said columns for scanning all of said columns to determine which of the selectors has been moved to a selecting position by the voter, means for registering the voter's selections as said scanning device is moved, means associated with each column for positively and simultaneously locking all of the selectors of that column against sliding movement, means for rendering the locking means of all columns effective to prevent sliding movement of all selectors during the movement of said scanning device, and means for rendering ineffective the locking means associated with those columns containing issues upon which the voter is eligible to vote, whereby the selectors of those columns may be manually moved along the columns from the non-voting position to the voting position.

37. The apparatus defined by claim 36 wherein each locking means comprises a structure extending along its column and movable between locked and unlocked positions, said structure being disposed when in the locked position in the path of sliding movement of the selectors in order to hold the selectors against sliding movement and being disposed when in the unlocked position to release the selectors for manual sliding movement.

38. The apparatus defined by claim 37 wherein said structure is mounted for pivotal movement upon its associated column between the locked and unlocked positions.

39. The apparatus defined by claim 37 wherein said structure includes a first member mounted for limited movement with respect to a second member, said first and second members being movable in unison between the locked and unlocked positions, said first member engaging the detent springs of its column and being movable with respect to said second member by movement of the selectors.

40. The apparatus defined by claim 38 wherein said structure includes first and second members, the first member being mounted for pivotal movement upon its column, and means mounting the second member for limited sliding movement relative to the first member between extended and retracted positions, said first and second members being pivoted in unison between the locked and unlocked positions, said second member engaging the detent springs of its column and being retracted slideably with respect to the first member by movement of the selectors.

41. The apparatus defined by claim 36 wherein the locking means comprises a locking member engaging each detent spring and movable when said spring is flexed by movement of the voting keys, and a locking structure associated with each column and movable between a first position wherein the selectors of its column are held against sliding movement and a second position wherein all of the selectors of its column are released for sliding movement.

42. The apparatus defined by claim 41 wherein the locking member comprises a pawl pivotally mounted in the column and biasing means acting to urge the pawl against one of the detent springs, each locking structure including a bar slideable along its column to control the pivoting movement of the pawls of that column.

References Cited by the Examiner

UNITED STATES PATENTS

| 1,194,337 | 8/16 | Lausterer | 235—54 |
| 3,118,598 | 1/64 | Laws | 235—54 |

LEO SMILOW, *Primary Examiner.*

UNITED STATES PATENT OFFICE
CERTIFICATE OF CORRECTION

Patent No. 3,190,549                         June 22, 1965

Edward J. Crossland et al.

It is hereby certified that error appears in the above numbered patent requiring correction and that the said Letters Patent should read as corrected below.

Column 14, line 15, for "columns" read -- column --; line 32, after "vote" insert -- whereby the selectors of those columns may be manually moved along the columns from the non-voting position to the voting position --; line 35, for "column" read -- columns --; column 15, line 30, for "selection" read -- selections --; column 16, line 5, strike out "the", first occurrence; same column 16, line 68, strike out "plurality of different"; line 69, for "positions" read -- position --; same line 69, after "to" insert -- a plurality of different --.

Signed and sealed this 29th day of March 1966.

(SEAL)
Attest:

ERNEST W. SWIDER                    EDWARD J. BRENNER
Attesting Officer                  Commissioner of Patents